Patented July 19, 1927.

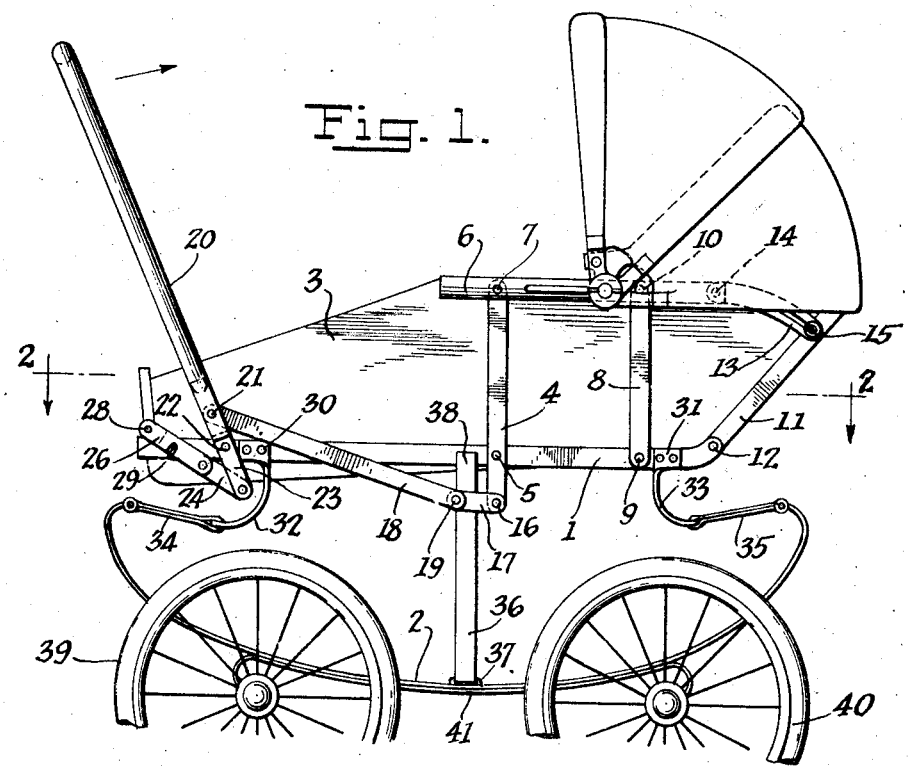
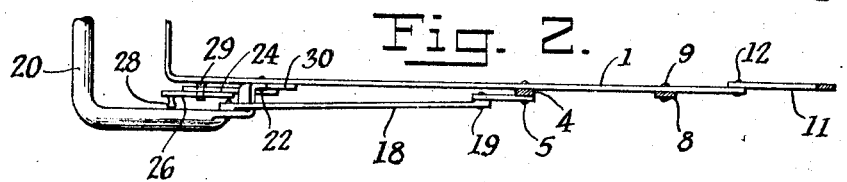
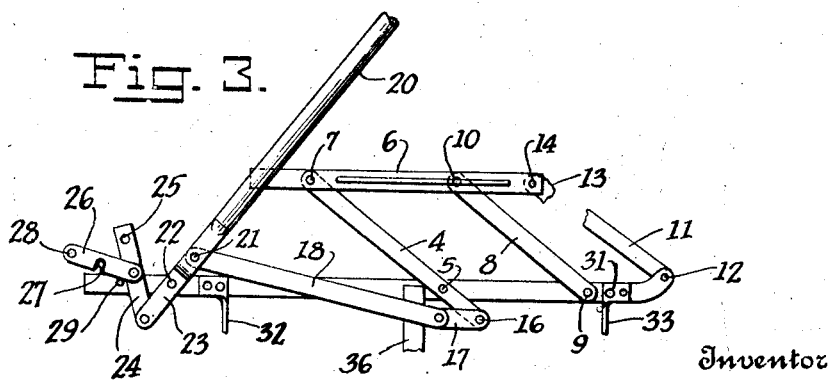

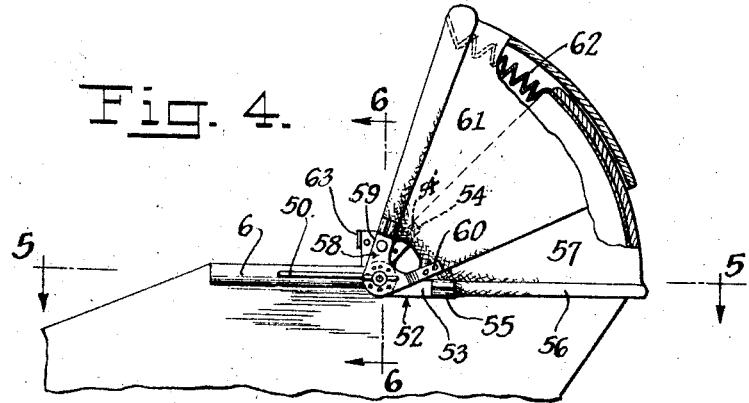
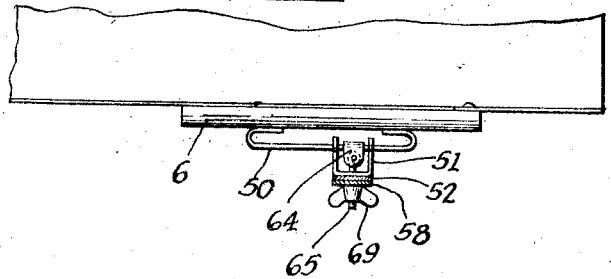
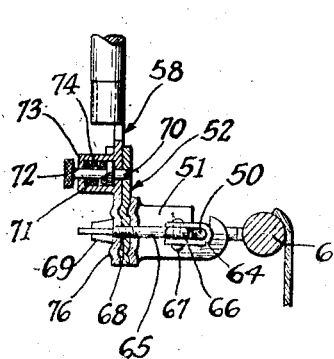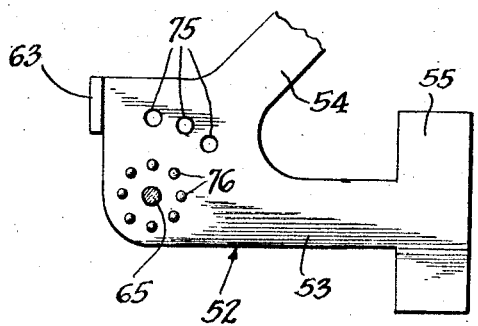

1,636,093

UNITED STATES PATENT OFFICE.

MAX HARTENSTEIN, OF NEW YORK, N. Y.

COLLAPSIBLE BABY CARRIAGE.

Application filed March 12, 1925. Serial No. 15,062.

The invention relates to new and useful improvements in baby-carriages.

A general object of this invention is to construct a baby-carriage with collapsible parts so as to make it compact and easily carried about.

A particular object of this invention is to provide a hood that is telescopic or collapsible and adjustable.

Another object of this invention is to provide a collapsible body for the carriage with locking means to prevent the collapse of the carriage structure when the carriage is in use.

With the above and other objects in view, which will be apparent as the description proceeds, the invention resides in the novel features of construction, combination and arrangement of parts as hereinafter described and defined by the appended claims, it being understood that changes in the precise embodiment might be made by those skilled in the art, without departing from the spirit of the invention.

Referring now to the accompanying drawings:

Fig. 1, is a view in elevation of a structure embodying my invention, the carriage being in condition for use.

Fig. 2, is a fragmentary view showing a plan view of the frame.

Fig. 3, is a view in elevation showing the frame about to be collapsed.

Fig. 4, is a vertical view of the hood or canopy.

Fig. 5, is a view partly in section taken on the lines 5—5 in Fig. 4.

Fig. 6, is a view taken on lines 6—6 in Fig. 4.

Fig. 7, is a detail of the locking plate.

In that form of my invention, which I have shown in the accompanying drawings, 1, represents a rectangularly shaped main frame, which is adapted to support the collapsible superstructure. The superstructure I have indicated generally by 3, and the supplemental base frame by 2.

Referring now particularly to Figs. 1, 2 and 3, the main frame 1, has pivoted thereto a lever 4, on the pivot 5, this lever is also pivoted to the horizontal bar 6, on the pivot 7. The main frame also has connected thereto a link 8, pivoted to the main frame 1, and horizontal bar 6, at 9 and 10 respectively, causing the bar to travel in parallel relation to the main frame.

To the extreme rear end of the frame at the pivot 12, there is pivoted a loose link 11, forming the backrest of the carriage. This loose link is adapted to adjustably swing in an arc of a slotted link 13, the latter pivoted to the horizontal bar 6, at 14. The adjustability is possible by the nut 15, which locks the loose link in any part of the slotted arc. In baby carriages of this type it is desirable to be able to incline the back of the seat at any angle within reasonable limits. I have provided, therefore, convenient means for maintaining the back of the seat in several adjusted positions.

The lower portion of the lever 4, has pivoted thereto at 16, a short link 17, a long link 18, is pivoted to link 17, at 19, and to the handle 20, at 21.

The handle during the collapsing operation is adapted to swing on the pivot 22, pivoted to the main frame, the portion of the handle below the pivot 22, is indicated by 23. To the lower end of the handle 23, there is pivoted a spring like metal bar 24, having a tendency to spring away from the main frame. An aperture 25, at the other end of the bar, is provided its function to be described later. At the center of the bar 24 there is pivoted a flat plate 26, the flat plate 26 being notched at 27, and having a handle 28, for operating same.

To the left of the pivot 22, on the main frame 1, there is provided a knob 29, to cooperate with the notch in the flat plate, which will be described in detail hereafter.

The superstructure 3, is supported on the base frame 2, as follows: The main frame 1 has connected to it at 30, 31 two arc-shaped iron pieces 32, and 33. Leather straps 34, 35, or any other resilient means are used to connect these arc-shaped iron pieces to the base frame 2.

A leather strap 36, attached to the base frame at 37, and to the main frame at 38, is adapted to hold the parts in a taut condition.

The wheels 39, 40, are supported on the supplemental frame 41, the latter is attached by brazing or otherwise to the base frame 2.

In operation, the handle 20, when swung on its pivot 22, in the direction of the arrow, indicated in Fig. 1, transmits its motion through links 18, and 17, and causes the lever 4, to rotate on pivot 5, in opposite direction, the link 8, is similarly rotated on pivot 9. The horizontal bar 6, is thus caused to be lowered or folded inwardly in parallel relation to the main frame 1. The loose link 11, also follows the link 8 and through the medium of the slot in the link 13, is further caused to fold inwardly.

The following means are adapted to prevent the collapse of the carriage. When in use the handle 20, is at the extreme left, this causes the aperture 25, of the spring metal bar to be aligned with the knob 29, and in that position the flat plate 26, is forced inwardly by handle 28, so as to cause the notch 27, to register with the knob 29.

To release the locking mechanism the operation is reverse, except that the spring metal 25, acts automatically.

The collapsible or telescopic hood will now be described in detail. To the horizontal bar 6, there is attached a horizontal rod 50, along this rod there is placed in sliding relation a hook shaped member 51. Adjacent to the hook shaped member there is arranged a right angled shaped member 52, having two arms 53, 54. At the end of the arm 53, the metal bends on itself as shown at 55, and forms a holder for the projection of the hood rod 56. The other arm 54, holds the other extremity of the hood section 57, by any means desired as rivets 54'.

Adjacent the right angled metal plate there is placed a V-shaped metal plate 58, having arms 59, and 60, which arms similarly support the hood section 61, and a lining 62 connects the extreme ends of the hoods so as to make it appear continuous from within.

In order to limit the movement of the outer hood section to the left, there is projecting from the plate 52, a piece of metal 63, which will abut against the arm 59, and thus cause the leftward movement of the hood section 61, to be brought to a stop.

In order to hold fast the hood sections at any part of the horizontal rod 50, there is provided a U-shaped member 64, enclosing upon itself and surrounding the rod 50, a hook 65, forming the axis upon which the hood sections rotate and the hook is turned at 66, between the ends of the U forming the pivotal point, and a rivet 67 forms the connection between the above members.

The other end of the hook 65 passes through the plates 52 and 58 and is threaded at its end 68 to receive a nut 69. It is seen that by a single tightening of this nut at any position along the horizontal rod performs both the function of holding the hood at any lengthwise position and also the function of holding the hood open to any degree desired.

When it is desired to keep the sections of the hood at a constant angular relation and only vary the longitudinal distance along the horizontal rod, there is provided a pin 70, with a limiting shoulder 71 and a operating knob 72. The pin is encased in a box 73, made part of or attached to the plate 59. Within the box and acting against the shoulder 71, there is a spring 74, urging the pin 70 into apertures 75 of the plate 52.

The plates 59, 52, and the hook 51 are provided with indentations or projections 76, to cause better gripping and to prevent possible movement between the above members when properly adjusted.

I claim:—

1. In a collapsible baby carriage, a main frame having a projection at one end thereof, a pivot on the main frame, a handle mounted on said pivot, a link pivotally attached to the handle and above the first mentioned pivot and operatively connected to a collapsible body, an apertured bar pivotally attached to the handle below the first mentioned pivot, a notched plate pivotally mounted on said bar and adapted to engage the projection on the frame after it has been passed through the aperture in the bar.

2. In a collapsible baby carriage, a main frame having a projection at one end thereof, a pivot on the main frame, a handle mounted on said pivot, a link pivotally attached to the handle and above the first mentioned pivot and operatively connected to a collapsible body, an apertured spring bar pivotally attached to the handle below the first mentioned pivot, a notched plate pivotally mounted on said bar and adapted to engage the projection on the frame after it has been passed through the aperture in the bar, said bar having the tendency to push away the notched plate when released from the projection.

In testimony whereof I affix my signature.

MAX HARTENSTEIN.